Figure 1:
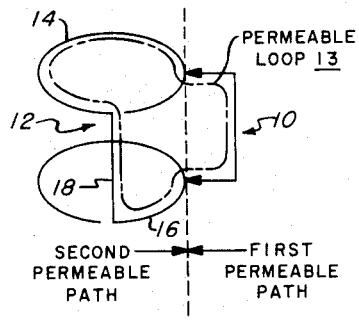

Feb. 16, 1965  F. A. SUMMERLIN ETAL  3,170,132
ELECTROMAGNETIC TRANSDUCERS
Filed May 1, 1961 5 Sheets-Sheet 1

INVENTORS
FREDERICK A. SUMMERLIN
FRANK DOVE
BY
*S.C.Yeaton*
ATTORNEY

Feb. 16, 1965   F. A. SUMMERLIN ETAL   3,170,132
ELECTROMAGNETIC TRANSDUCERS
Filed May 1, 1961   5 Sheets-Sheet 2

INVENTORS
FREDERICK A SUMMERLIN
FRANK DOVE
BY

ATTORNEY

Feb. 16, 1965  F. A. SUMMERLIN ETAL  3,170,132
ELECTROMAGNETIC TRANSDUCERS
Filed May 1, 1961  5 Sheets-Sheet 4

INVENTORS
FREDERICK A. SUMMERLIN
FRANK DOVE
BY
*S.C.Yeaton*
ATTORNEY

INVENTORS
FREDERICK A. SUMMERLIN
FRANK DOVE
BY
ATTORNEY

United States Patent Office 3,170,132
Patented Feb. 16, 1965

3,170,132
ELECTROMAGNETIC TRANSDUCERS
Frederick Arthur Summerlin, Isleworth, and Frank Dove,
St. Albans, England, assignors to The Sperry Gyroscope
Company Limited, Brentford, England, a company of
Great Britain
Filed May 1, 1961, Ser. No. 106,942
Claims priority, application Great Britain, May 3, 1960,
15,472/60
6 Claims. (Cl. 336—132)

This invention relates to electromagnetic transducers and is particularly, but not exclusively, applicable to transducers employed as pick-offs.

According to the invention there is provided an electromagnetic transducer comprising two relatively movable members of magnetically permeable material defining fir stand second magnetically permeable paths and arranged to cooperate to define a magnetically permeable loop, said loop lying through substantially the whole of the first magnetically permeable path and a variable portion of the second magnetically permeable path, the portion depending upon the relative positions of said members, a winding arranged to link electromagnetically with the second magnetically permeable path whereby a variable number of its turns are linked with said loop according to the relative positions of the members, and an additional winding arranged to link electromagnetically with said loop irrespective of the relative positions of said members.

The invention also provides an electromagnetic transducer comprising two relatively movable members of of magnetically permeable material defining respectively first and second magnetically permeable paths and arranged to cooperate to define a magnetically permeable loop, said loop lying through substantially the whole of the first magnetically permeable path and a predetermined fraction of the second magnetically permeable path, the portion of said second path forming said fraction being adjusted in dependence upon the relative positions of said two members and arranged to include at least part of each of two windings associated with said second path and the whole of an additional winding linked with said loop.

Further, the invention provides an electromagnetic transducer comprising two relatively movable members of magnetically permeable material defining respectively first and second magnetically permeable paths and arranged to cooperate to define a magnetically permeable loop, said loop lying through substantially the whole of the first path and a portion of the second path, two windings arranged to be connected in series opposition between two output terminals and formed along parts of the second magnetically permeable path and arranged each to be at least partly linked with the loop, relative movement between the two relatively movable members varying differentially the proportion of each winding linked with said loop, and an additional winding associated with one of the paths and arranged wholly to be linked with said loop.

Figure 3:
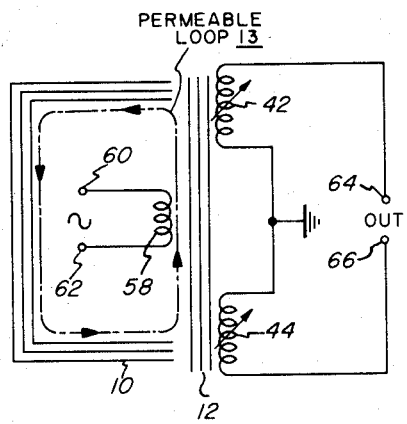
Figure 4:
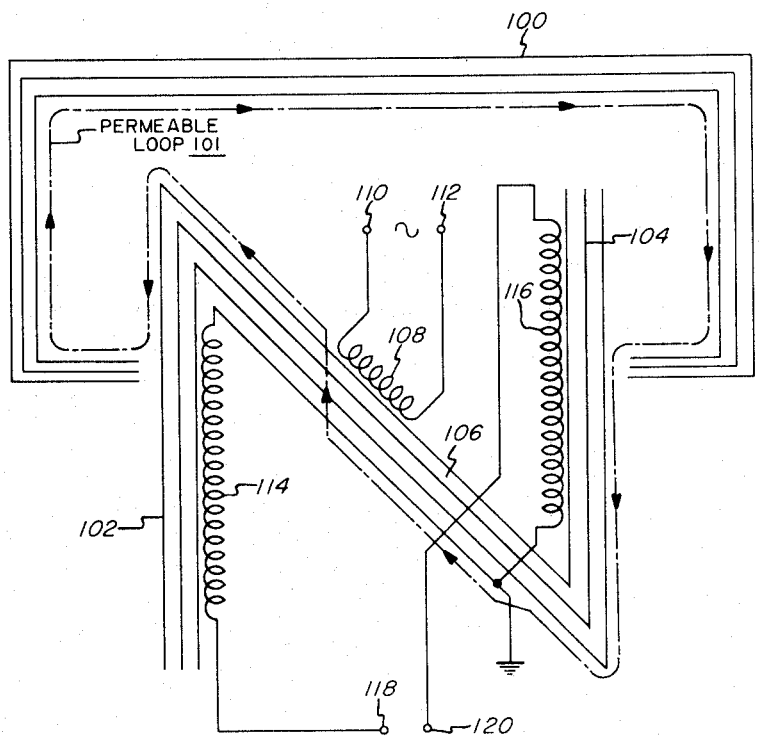
Figure 2:
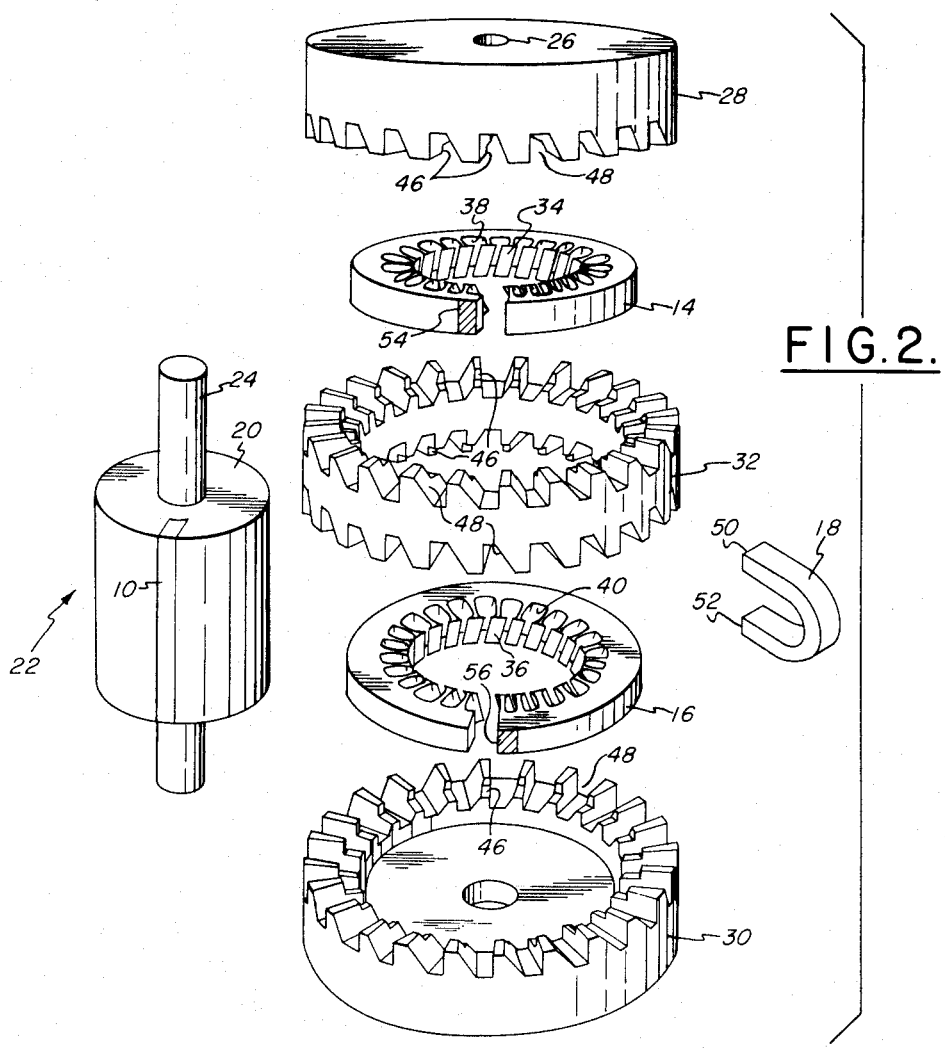
Figure 2A:
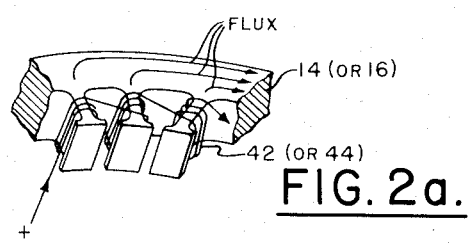
Figure 2B:
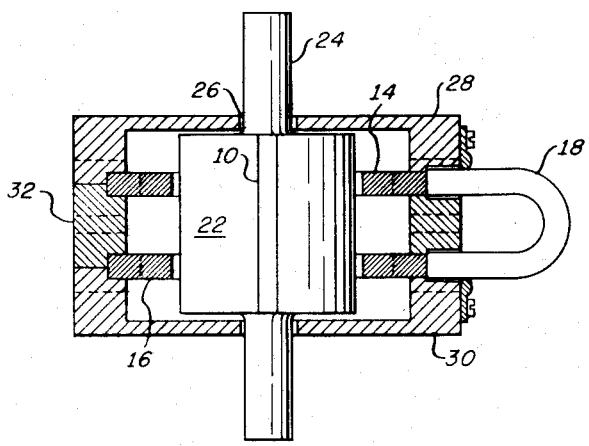
Figure 5:
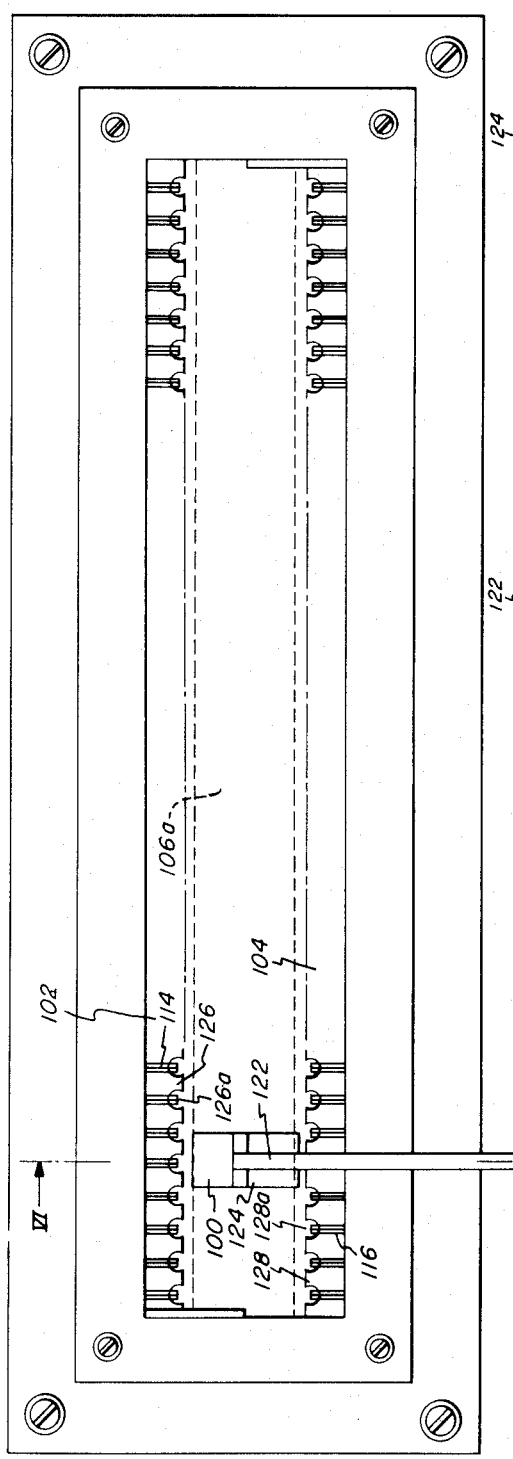
Figure 6:
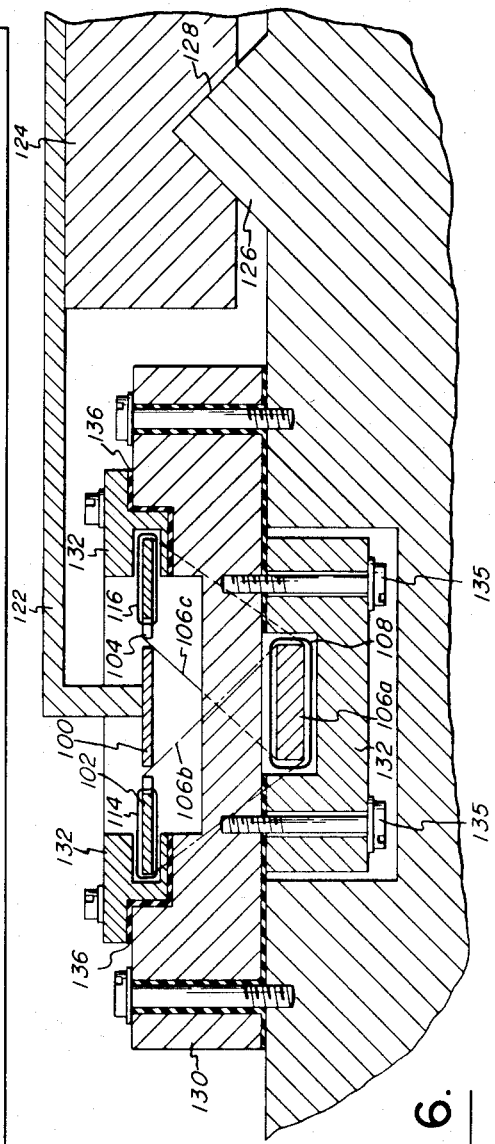
Figure 7:
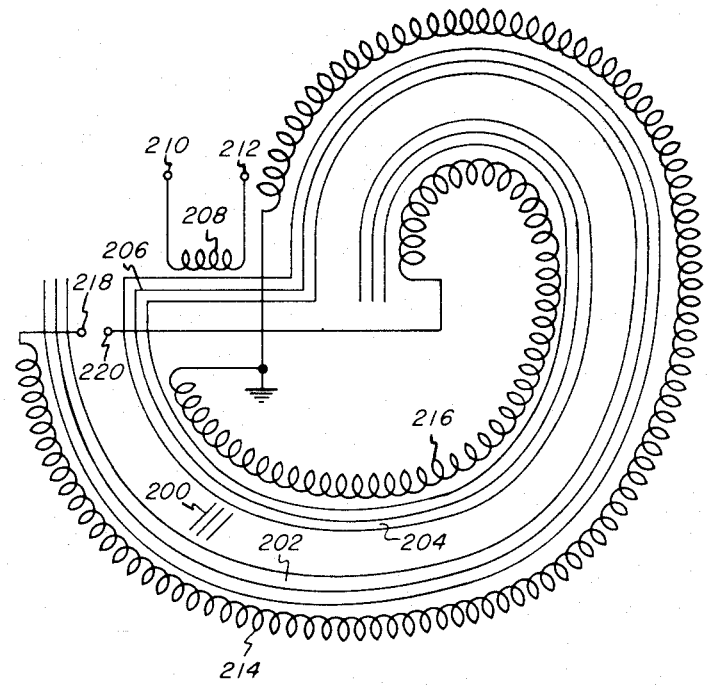
Figure 8:
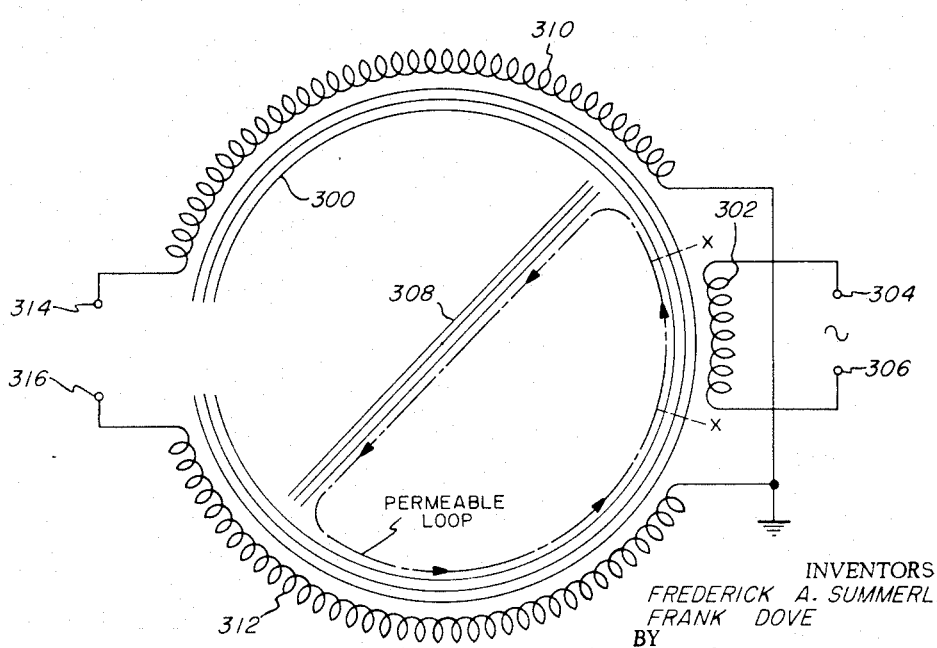

In order that the invention may be more readily understood some embodiments thereof will now be described, by way of example only, with reference to the accompanying drawings in which:

FIGURE 1 is a diagrammatic representation of the magnetically permeable paths of one electromagnetic transducer in accordance with the present invention, FIGURE 2 is an exploded view of a transducer, the permeable paths of which are shown in FIGURE 1, and FIG. 2a shows how electric windings are placed on parts of the structure of FIG. 2, FIGURE 2b is an assembly, shown partly in section, of the elements of FIGURE 2, FIGURE 3 is a circuit diagram of the arrangement of windings relative to the magnetically permeable paths in the transducer shown in FIGURES 1 and 2, FIGURE 4 is a circuit diagram of the arrangement of windings relative to the magnetically permeable paths in another electromagnetic transducer in accordance with the present invention, FIGURE 5 is a plan view of the transducer shown in FIGURE 4, FIGURE 6 is a cross-sectional view taken on the line 6—6 of FIGURE 5, FIGURE 7 is a circuit diagram of the arrangement of winding relative to the magnetically permeable paths in yet another electromagnetic transducer in accordance with the present invention, and FIGURE 8 is a circuit diagram of the arrangement of windings relative to the magnetically permeable paths in an additional electromagnetic transducer in accordance with the present invention.

With reference to FIGURES 1 to 3 a rotary pick-off is described which, in operation, provides an electric output signal representing the relative rotational positions of a mechanical input shaft and the pick-off casing. As shown in FIGURE 1, the pick-off has a pair of cooperating magnetically permeable paths 10 and 12 arranged to define a magnetically permeable loop 13.

In the following discussion, like reference numerals are used on FIGS. 1–3 to define corresponding elements on each of the figures, e.g. the first permeable path and the physical means defining such path are both designated by the numeral 10, this being for purposes of clarity.

The first permeable path 10 is arranged to be rotatably movable relative the second path permeable path 12, such second path being created by two approximately coaxial, axially-spaced, part-circular members 14 and 16 magnetically connected, in a direction approximately parallel to their common axis, by a yoke 18. The members 14 and 16 extend in opposite directions from the yoke 18, the member 14 in a clockwise direction and the member 16 counterclockwise. Both members extend over an arc of about 330° and are so rotationally displaced about their common axis that they overlap over an arc of about 300°. The magnetically permeable loop 13 defined by the co-operation of the first and second magnetically permeable paths 10 and 12 lies through the whole of the first path 10 and a variable part of the second path 12 depending upon the relative positions of the first path 10 with respect to the members 14 and 16 of the second permeable path 12, the proportions of the members 14 and 16 in the complete loop 13 varying differentially as the first path 10 is moved.

Construction-wise (see FIG. 2) the first permeable path 10 is formed from a stack of laminations and carried in a cylindrical body 20 to form a movable armature 22. The armature 22 is provided with an approximately central shaft 24 which extends from its ends and is journalled in bearings (of which only the bearing 26 is visible in the drawing) in the end faces of a three-part pick-off casing consisting of members 28, 30 and 32. The part-annular members 14 and 16 of the second magnetically permeable path 12, (which in this arrangement lies outside the armature), are each formed from a stack of laminations and present respectively inwardly projecting skewed teeth 34 and 36. The teeth 34 form between them relatively deep, radially disposed slots 38, and the teeth 36 likewise form slots 40. The skewing of the teeth 34 and 36 serves to produce a gradual variation in the output signal as the armature 22 moves relative to the part-annular members 14 and 16 instead of the step variation which would occur without such skewing. Windings 42 and 44 (see FIG. 3) are arranged respectively in the slots 38 and 40 of the part-annular members 14 and 16, such windings being wound generally as shown schematically in FIG. 2a. The part-annular members 14 and 16 are spaced axially by the casing member 32 which, together with the other casing members 28 and 30, is formed from non-magnetisable material to avoid interfering with the operation of the pick-off. The members 14 and 16 are adapted to abut against the depressed portion 46 of the casing members 28, 30 and 32. Further, the edges of these casing members which are adjacent the members 14 and 16 have radially disposed slots 48 so that when the pick-off is assembled, the casing members 28, 30 and 32 all clear the windings 42 and 44. The yoke 18, which links the members 14 and 16, is formed as a U-shaped member of magnetic laminations, the ends 50 and 52 of which are arranged to abut against the outer edges of the members 14 and 16 at the portions, shown hatched for clarity, designated 54 and 56. The end of the yoke 18 extends through apertures (not shown) machined in the pick-off casing after the part-annular members 14 and 16 and the armature 22 have been assembled therein, such yoke 18 being adapted to hold a winding 58 (see FIG. 3) which, in operation, has applied to it a reference alternating current signal for energizing the pick-off device by creating flux in the magnetically permeable loop 13.

The reference alternating current signal is applied across the terminals 60 and 62, and the flux produced in the permeable loop by this signal links with part of the winding 42 wound on the part-annular member 14 and with part of the winding 44, wound on the part-annular member 16. Because the parts of the winding 42 and 44 linked by the flux (produced by the excitation winding 58) are variable and depend on rotor 22 rotation, i.e. the relative position of the first permeable path 10 with respect to the parts 14 and 16 of the second permeable path 12, arrows indicating variability are shown crossing the windings 42 and 44 on FIG. 3. The windings 42 and 44 are connected in series opposition between a pair of output terminals 64 and 66 from which may be derived an output signal having a phase and amplitude dependent upon the rotation of the armature 22, i.e. the first permeable path 10, relative a reference position; the output signal across the terminals 64 and 66 has zero amplitude when the number of turns of the windings 42 and 44 cut by the flux in the permeable loop 13 are equal, and in the arrangement shown in FIGURE 2, this neutral position is arranged to be that at which the first permeable path member 10 of the armature 22 is diametrically opposite the portions 54 and 56 of the part-annular members 14 and 16. To achieve highest accuracy of the pick-off it is arranged that the number of turns in the windings 42 and 44 are equal and the total number of turns linked by flux in the permeable loop for any relative position of the members defining the first and second paths 10 and 12 within their range of movement is approximately constant.

The pick-off of FIGURE 2 is effective even though its armature is moved through an angle of 330°, i.e. 165° on either side of the neutral position, such range being limited solely by the dimensions of the members 10, 14, 16 and 18.

The electromagnetic transducer shown in FIGURES 4 to 6 is a linear pick-off from which, in operation, an electric output signal is obtainable representing the position of a mechanically movable armature member relative to an elongated stator member. As in the rotary pick-off, first and second magnetically permeable paths are arranged to cooperate to define a magnetically permeable loop 101; also, as in the above description, like reference numerals are used to indicate corresponding elements in FIGS. 4 to 6. Here, the first path 100 is arranged to be movable relatively to the second path such second path having two portions 102 and 104 arranged to be spaced from, and approximately parallel to, each other along an elongated path. The portions 102 and 104 are connected by a yoke 106 which extends from one end of the portion 102 to the other end of the portion 104. The magnetically permeable loop 101 (see FIG. 4) defined by the cooperation of the two paths lies through the whole of the first path and a variable part of the second path depending upon the position of the first path 100 with respect to the portions 102 and 104. The proportions of the portions 102 and 104 in the loop 101 vary differentially as the first path 100 is moved relative to them. An exciting winding 108 is wound on the yoke 106 and connected between terminals 110 and 112 to which is applied a source of reference alternating current to excite the pick-off by providing a alternating flux through the permeable loop 101. The flux produced in the permeable loop 101 by this signal links with part of one secondary winding 114 and part of another secondary winding 116. The windings 114 and 116 are connected in series opposition between a pair of output terminals 118 and 120 from which may be derived an output signal having a phase and amplitude depending upon the relative positions of the members defining the first and second paths. As in the case of the rotary pick-off, the output signal across the terminals 118 and 120 has zero amplitude when the number of turns of the windings 114 and 116 cut by the flux in the permeable loop are equal, and in general this neutral position will be arranged to be that at which the first permeable path 100 is half-way between the limits of its movement along the portions 102 and 104 of the second permeable path. To achieve highest accuracy it is again arranged that the number of turns in the windings 114 and 116 are equal and the total number of turns of these two windings which is linked in any of the relative positions of the first and second paths within their range is approximately constant.

Construction-wise the pick-off of FIG. 4 is shown in detail in FIGURES 5 and 6. The first permeable path 100 here is formed from a stack of laminations and carried on an arm 122 of non-magnetisable material from a movable member such as a machine tool slide 124, the position of which is required to affect the output signal from the pick-off. The slide 124 may be carried on a V-shaped guide 126 which engages in a complementary groove 128 in its under surface. For mechanical stability the slide 124 is supported by an additional means (not shown) which may consist of another slide, roller, or other suitable means. The second magnetically permeable path is defined by two elongated magnetically permeable members each of which is formed from a stack of laminations; one such member provides the portion 102 of the second permeable path and the other member provides the portion 104 of the second permeable path (each member being further arranged to present respectively, extending towards the other, projecting skewed teeth 126 and 128). These teeth respectively define between them slots 126a and 128a in which the coils 114 and 116 are respectively wound, their respective axes being approximately coaxial with the length of their supporting members to form sections of an elongated solenoid between which such teeth project transversely. The members 102 and 104 are spaced apart by a casing member 130 of non-magnetizable material to which the members 102 and 104 are clamped by bolt-secured retaining portions 132. As in the case of the rotary pick-off, grooves 134 are formed in the casing member 130 to provide a clearance for the coils (114 and 116). The yoke 106 which links together the members 102 and 104 is formed similarly to these members from three stacks of magnetic laminations 106a, 106b and 106c. For convenience the yoke part 106a lies approximately parallel to the members 102 and 104 and is spaced from them by a distance sufficient to avoid unwanted magnetic interaction between them. The yoke part 106a is coupled to the members 102 and 104 through yoke parts 106b and 106c respectively. Distributed along the length of the yoke part 106a is the energising winding 108. This winding 108 is formed as a single-layer solenoid, its supporting yoke part 106a being clamped to the casing member 130 by means of a channel-shaped clamp 132 secured thereto by bolts 135. In order to avoid the clamps and other conductive members around the windings 114 and 116 forming short-circuited turns linked electromagnetically with the windings, they are insulated from each other by interposed sheets of insulating material 136, and the various securing bolts which hold the pick-off together are either made of nonconductive material, such for example as nylon, or provided with insulating washers and sleeves to maintain the various members in insulated relationship with each other.

Transducers according to the invention may take many other forms. Two of these forms are illustrated diagrammatically in FIGURES 7 and 8. That shown in FIGURE 7 has the first magnetically permeable path defined by an armature 200 and the second magnetically permeable path by magnetically permeable members 202 and 204 which lie on concentric circles of different radii in one plane, the member 202 extending clockwise from one end of a radially extending yoke 206 and the member 204 extending counterclockwise from the other end of the yoke. The yoke 206 carries an energising winding 208 arranged to have applied to it by way of terminals 210 and 212 a reference alternating current signal to create an energising flux. The two secondary or output windings 214 and 216 are connected in series opposition between the output signal terminals 218 and 220 from which an output signal having a phase and amplitude dependent upon the relative positions of the armature 200 and members 202 and 204 may be derived.

This arrangement may be further modified so as to give signals showing angular displacement through a full 180° on either side of a central position. To this end, the magnetically permeable members 202 and 204 defining the second magnetically permeable path are formed as flat spirals extending in opposite directions from the end of a yoke which is directed approximately radially. The spiral formed members lie parallel to one another, the radius of one increasing towards its distal end while the radius of the other decreases.

An armature, preferably connected to a member pivoted about a central axis perpendicular to the plane of the spiral members, is constrained to follow a spiral path to bridge parts of these members which lie in the same general direction from their common axis. It will be seen that if the yoke (or the armature) is slightly skewed in relation to a plane through the central axis, and the core elements extend a little beyond 360°, signals indicating the angular position of the pivoted member can be obtained through a complete revolution of that member.

The transducer shown in FIGURE 8 is a very simple form of rotary pick-off. In this, the second magnetically permeable path (yoke and two permeable portions) is formed by a single arcuate magnetically permeable member 300 which extends through about 330°. The yoke portion X—X is about midway along its length and extends through about 30° and carries the energising winding 302 which has a reference alternating current signal applied to it between the terminals 304 and 306 for creating an energising flux in the magnetically permeable loop defined between the member 300 and a relatively movable armature 308. The armature 308 is pivoted about the axis of the member 300 and extends between diametrically opposite portions adjacent said member. Depending upon the relative rotational position of the members 300 and 308 the number of turns of the secondary windings 310 and 312 linked with flux in the magnetically permeable loop is varied differentially. These windings are connected in series opposition between two output terminals 314 and 316 from which may be derived an output signal having a phase and amplitude depending upon the relative rotational position of the members 300 and 308. This pick-off will indicate angular displacements of about 75° to either side of its neutral position.

What is claimed is:

1. An electromagnetic transducer comprising first and second members of magnetically permeable material, the first of said members defining a first magnetically permeable path and the second of said members defining second and third magnetically permeable paths which are stationary with respect to each other, means rigidly supported by and cooperating with said second member to provide a low reluctance path from one end of said second permeable path to one end of said third permeable path, means for inducing an alternating magnetic field in at least the permeable material of said first member, a pair of windings connected in series opposition and so supported by said second member that said windings link electromagnetically with, and are respectively substantially evenly distributed along the two permeable paths defined by the second magnetically permeable member, and means supporting said first and second members so that they are relatively movable and define a single magnetically permeable loop of a substantially constant permeance that lies through substantially the whole of both the path defined by said first magnetically permeable member and the low reluctance path provided by said rigidly supported means and a variable portion of each of the paths defined by the second magnetically permeable member depending upon the relative positions of said two relatively movable members, whereby a variable number of turns of each of said pair of windings is linked with said loop according to the relative positions of said first and second members, and whereby a substantially constant number of turns of said pair of windings is continually linked electromagnetically with said loop irrespective of the relative positions of said members.

2. An electromagnetic transducer as claimed in claim 1 wherein said second member comprises first and second arcuate members of magnetically permeable material having each a high reluctance region between its respective ends, and wherein said first member is supported for pivotal movement about the axis of the arcuate members in such close proximity to said arcuate members that it provides a relatively low reluctance path between said arcuate members.

3. The apparatus of claim 1 wherein the second and third magnetically permeable paths defined by said second member are substantially concentric paths of different radii and in a common plane, said means rigidly supported by said second member lying in a plane perpendicular to said common plane, one of said concentric paths extending clockwise and the other counterclockwise with respect to said means rigidly supported by said second member.

4. The apparatus of claim 1 wherein said second member defines two spaced, approximately parallel magnetically permeable paths, and said first member is arranged to define a magnetically permeable path transversely between them.

5. An electromagnetic transducer comprising first and second substantially annular permeable members each having radially extending projections for the support of respective output windings adapted to be connected in series opposition, said members each having a high reluctance discontinuity therein, a rotor having an axially extending permeable strip and being coaxially supported for rotation with respect to both annular members, permeable means forming a magnetic bridge from a point near the high reluctance discontinuity of one annular member to a point near the high reluctance discontinuity of the other annular member whereby the permeability of the magnetic loop comprising the strip and both annular members remains substantially constant when there is relative rotation between the rotor and said annular members, and an excitation winding on said means forming a magnetic bridge, whereby a differential output voltage is induced across the windings supported by said annular members representing the relative rotation between said rotor and the annular members.

6. The apparatus of claim 5 wherein said projections are arranged to form skewed slots, whereby the differential output voltage is made substantially linear throughout the range of the transducer.

References Cited in the file of this patent

UNITED STATES PATENTS

| | | |
|---|---|---|
| 705,482 | Theirmann | July 22, 1902 |
| 2,118,757 | Bergstrom | May 24, 1938 |
| 2,170,456 | Lord | Aug. 22, 1939 |
| 2,484,569 | Jewell | Oct. 11, 1949 |
| 2,545,881 | Graham | Mar. 20, 1951 |
| 2,843,842 | King | July 15, 1958 |
| 2,844,316 | Liebknecht | July 22, 1958 |
| 2,866,913 | Kronacher | Dec. 30, 1958 |
| 2,912,767 | Mittelmann | Nov. 17, 1959 |
| 2,928,060 | Krussmann | Mar. 8, 1960 |
| 2,957,149 | Dittrich et al. | Oct. 18, 1960 |